April 20, 1937.  F. C. BOWERMAN  2,077,736
CONVERTIBLE AUTOMOBILE ACCESSORY
Filed Oct. 31, 1936   5 Sheets-Sheet 1
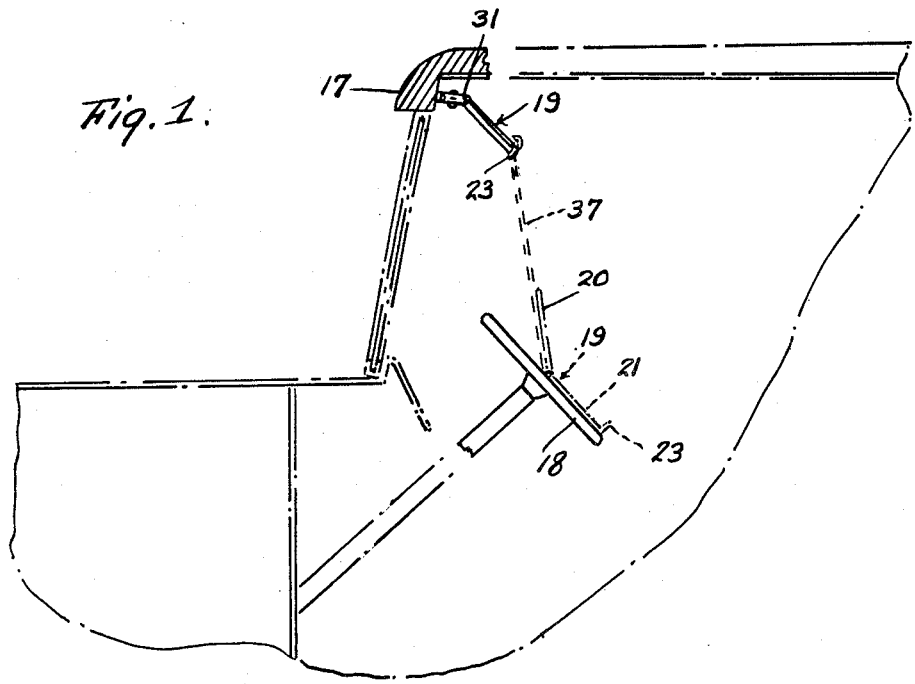
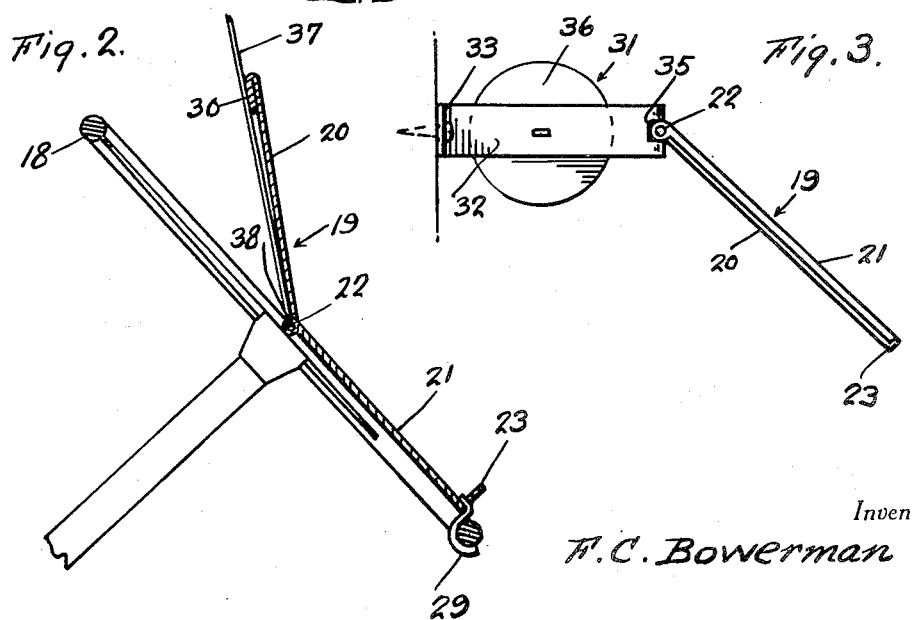
Inventor
F. C. Bowerman
By Clarence A. O'Brien
Hyman Berman
Attorneys

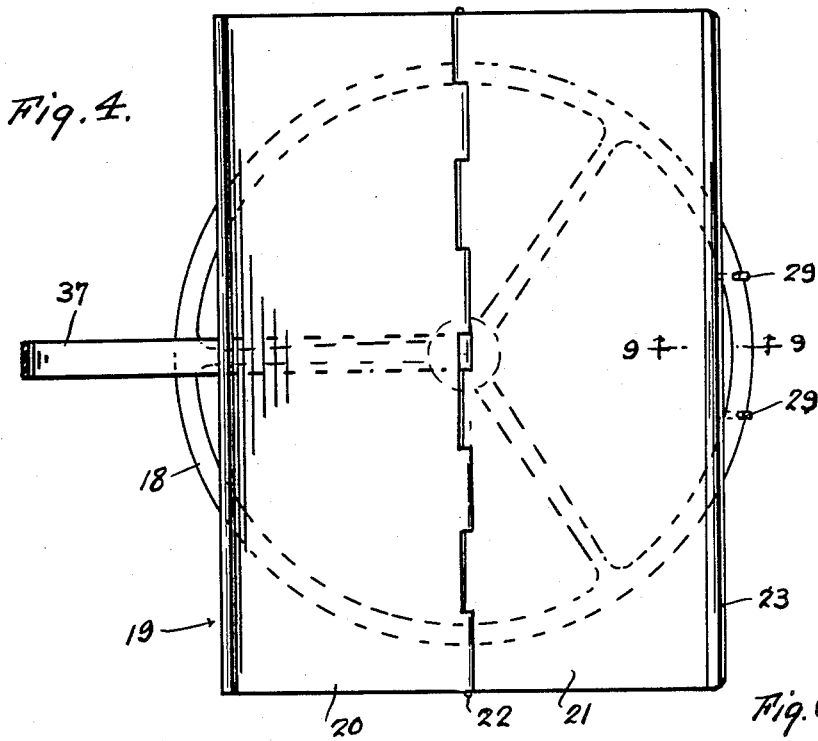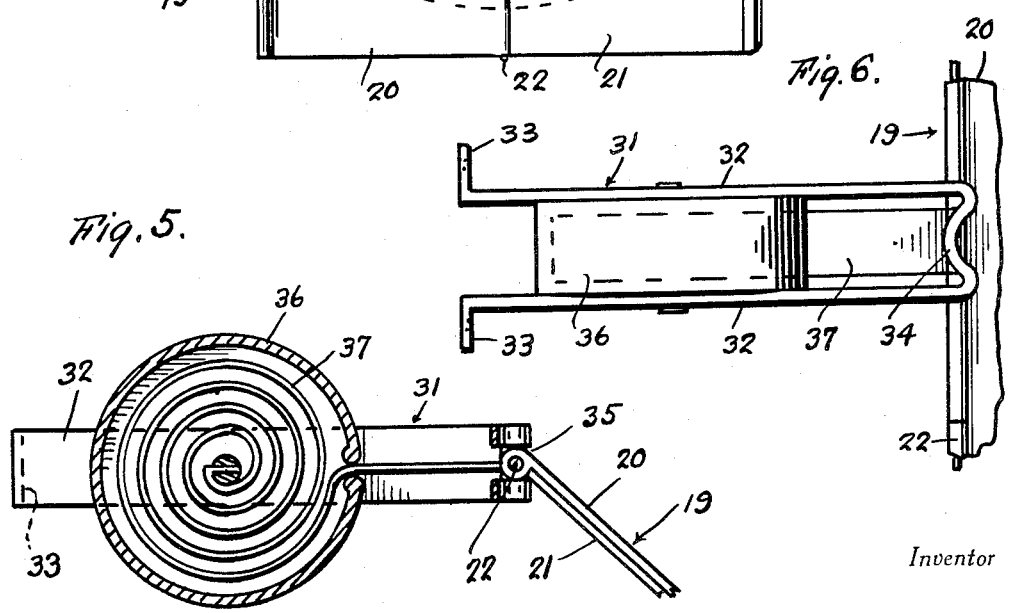

April 20, 1937.  F. C. BOWERMAN  2,077,736
CONVERTIBLE AUTOMOBILE ACCESSORY
Filed Oct. 31, 1936  5 Sheets-Sheet 3
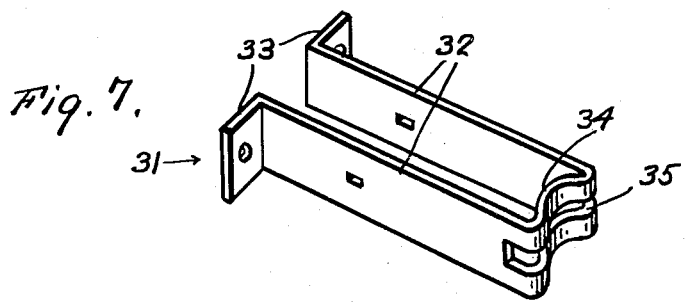
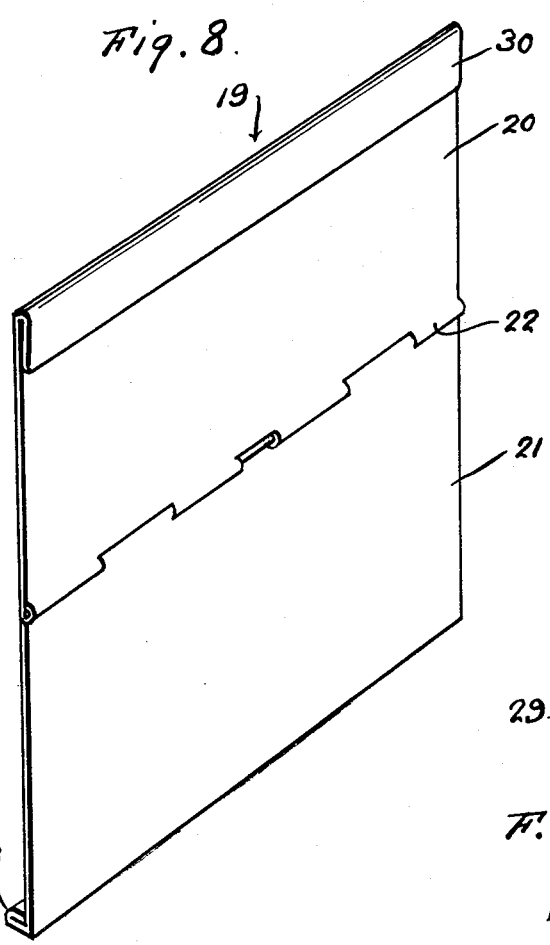
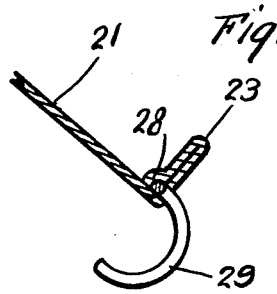
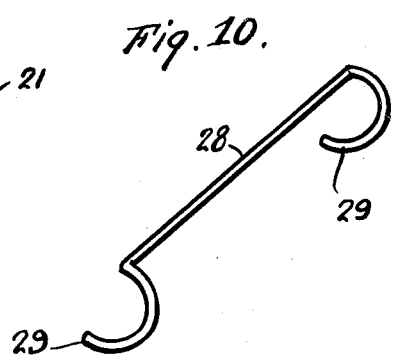
Inventor
F. C. Bowerman
By Clarence A. O'Brien
Hyman Berman
Attorneys April 20, 1937.　　　F. C. BOWERMAN　　　2,077,736
CONVERTIBLE AUTOMOBILE ACCESSORY
Filed Oct. 31, 1936　　　5 Sheets-Sheet 4

Inventor
F. C. Bowerman
By Clarence A. O'Brien
Hyman Berman
Attorneys

April 20, 1937. F. C. BOWERMAN 2,077,736
CONVERTIBLE AUTOMOBILE ACCESSORY
Filed Oct. 31, 1936 5 Sheets-Sheet 5

Inventor
F. C. Bowerman
By Clarence A. O'Brien
Hyman Berman
Attorneys

Patented Apr. 20, 1937

2,077,736

UNITED STATES PATENT OFFICE 2,077,736

CONVERTIBLE AUTOMOBILE ACCESSORY

Frank C. Bowerman, Lake Williams, N. Dak.

Application October 31, 1936, Serial No. 108,675

7 Claims. (Cl. 296—97)

This invention relates to so-called automotive appliances and accessories and has reference in particular to a novel convertible double purpose construction which has reference in one instance to a sun visor and, secondly, to what may be conveniently called a miniature stearing wheel desk.

In transforming the inventive idea into a practicable physical adaptation I find that it is essential to provide a versatile structural assembly, and in thus reducing the idea to actual practice, I have evolved and produced several embodiments collectively having appreciable generic or common characteristics. Consequently, the basic principle of the invention has to do with the adoption and use of an attaching bracket or fixture designed to be rigidly connected with the windshield at the desired point in advance of the driver, the same being constructed to accommodate the interchangeable or convertible unit employable, when connected with the bracket, as a sun visor, and movable in a position remote to the fixture and attachable to the steering wheel to function as a convenient writing desk.

The chief feature of construction, common to the broad invention is a sectional unit embodying a pair of hingedly connected plates, said plate being foldable into overlapping relationship when used as a sun visor, and being spread into the same plane with each other and attached to the steering wheel when used as a desk.

Additionally, however, novelty is thought to reside in the adoption and use of a windshield bracket with a simple clip arrangement which enables the sectional or foldable unit to be bodily detached therefrom allowing it to be selectively used in either of the aforementioned capacities.

More specifically, novelty is thought to exist in a permanent flexible connection between the sectional desk and visor unit, and the mounting of bracket on the windshield.

Other features of the invention will become more readily apparent from the following description and accompanying drawings.

In the drawings; wherein like numerals are employed to designate like parts throughout the views:

Figure 1 is a view which may be conveniently described as a diagrammatic character showing the steering wheel and a part of the body above the windshield to which the invention is attached, the invention being shown attached in visor forming position in full lines and extended to desk forming position in dotted lines.

Figure 2 is a sectional view through the double plate unit showing how it may be employed in the capacity of a temporary steering wheel writing desk.

Figure 3 is an edge view of the complete invention showing how the retractible and extensible "desk" is used as a sun shield or visor.

Figure 4 is an enlarged plan view showing the miniature desk in place, this being what may be called a top plan view of the structure seen in Fig. 2.

Figure 5 is a sectional view through the mounting or bracket showing the spring reeling drum feature.

Figure 6 is a top plan view, in complete elevation, of the assembly depicted in Fig. 5.

Figure 7 is a perspective view of the adaptation or attaching bracket, sometimes referred to as the mounting.

Figure 8 is a perspective view of the two-part sectional convertible unit showing the plate sections disposed in a plane even with each other.

Figure 9 is a section which may be said to be taken on the plane of the line 9—9 of Fig. 4 with the device detached from the steering wheel.

Figure 10 is a perspective view of the swingable or pivoted double-hook attaching or anchoring member.

Figure 14:
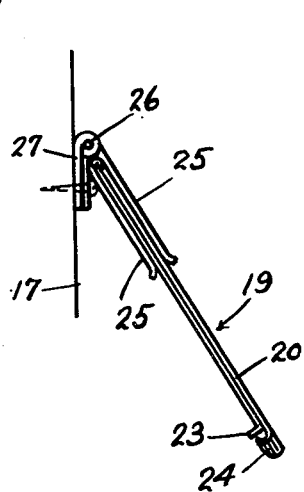
Figure 14 is an end or edge elevational view showing a comparatively simple form or embodiment of the invention wherein the desk unit is employed as a visor and detachably connected with the retaining bracket.
Figure 15:
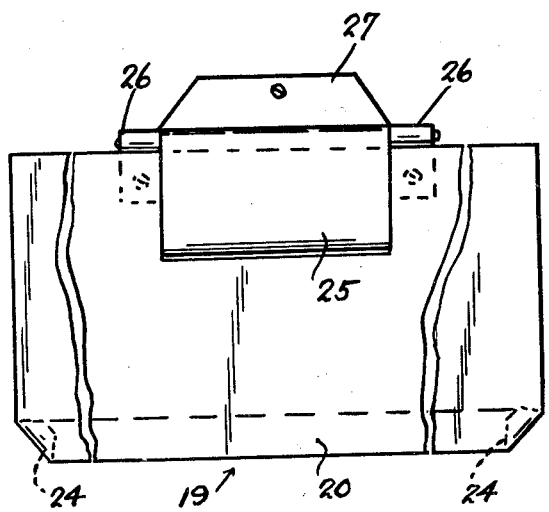
Figure 15 is a face or inside elevational view of the arrangement shown in Fig. 14 observing in its direction from right to left.
Figure 16:
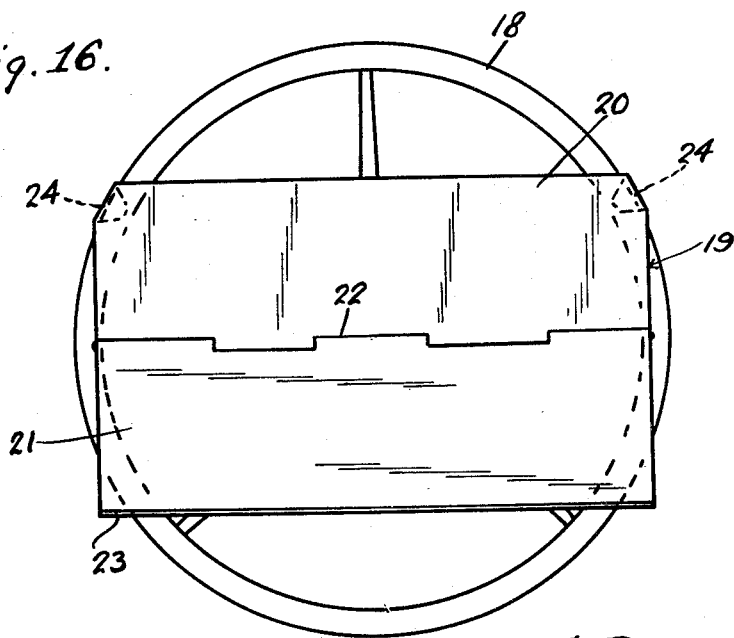
Figure 16 is a top plan view showing how the desk, the above style of the invention, is utilized.

As a matter of convenience and for obvious reasons attention is first invited to the simplified form of the invention illustrated in Figs. 14 to 16 inclusive. In these figures as well as in other figures the body of the car, which is a relatively fixed part, is distinguished by the numeral 17, while the steering wheel is indicated at 18. The sectional convertible visor-desk is denoted by the numeral 19. This, due to its special function, may be described as a convertible multiple purpose unit. It comprises a pair of substantially duplicate companion sections or plates 20 and 21, these having their inner longitudinal ends hinged together as at 22 to allow them to be folded in overlapping relationship as shown in Fig. 14 or swung into the same plane with each other to form a desk as illustrated in Fig. 16. The section or lower plate 20 is slightly different in proportion to the other plate to allow said plates to fold into convenient overlapping relationship. It is provided with a lateral flange 23 which constitutes a ledge. The corner portions of the remaining plate 20 are bent upon themselves to provide hooks 24 which may be releasably engaged over the rim of the steering wheel as shown to advantage in Fig. 16. Thus by spreading the plates 20 and 21 in the same plane with each other and attaching the hooks 24 to the steering wheel said unit 19 may be formed into a writing desk. When the sections are folded together as shown in Figs. 14 and 15 the device may be employed as a sun shield or so-called visor. When used in the latter capacity the hinged ends of the plates are simply slipped into the keeper formed by the resilient clips or grips 25. These grips form part of a holder which is hingedly connected as at 26 to the relatively fixed attaching member 27 which is in turn screwed or otherwise fastened to the fixed support 17. A friction type hinge may be utilized so as to permit the visor to be swung up against the roof of the car when not in use or swung down to a position in close relation to the windshield (not shown) when used. Thus, in this simple embodiment of the invention the detachable association of the sectional unit with the holder or mounting on the part 17 permits it to be selectively used in the desired capacity.

Attention is now invited to the somewhat different construction or embodiment illustrated in Figs. 1 to 10 inclusive and by way of introduction to this phase of the invention attention is conveniently invited to Fig. 8 wherein the unit forming the so-called convertible visor and desk is denoted by the same numerals as already described, that is to say is indicated at 19 and includes the plates 20 and 21 hingedly joined together as at 22, the plate 21 having a ledge 23. It is also constructed and shown in Fig. 9 to accommodate a retention hook and this comprises a rod or rocker shaft 28 mounted in a suitable sheath formed in said ledge. The shaft is provided with fingers or hooks 29 releasably engageable with the rim of the steering wheel as shown for instance in Fig. 2. The plate 20 may, in this arrangement be formed with a return bend or edge 30 which constitutes a convenient retention element for loose papers and the like. The visor-desk unit in this arrangement is permanently attached to reeling and winding means of the type shown. This means includes an attaching fixture or bracket 21 of the form shown in Fig. 7. It is generally U-shaped and has spaced parallel arms as indicated at 32 provided with laterally bent terminals 33 attachable to the body of the car, that is the so-called fixed support 17. The bight portion is properly shaped as indicated at 34 and provided with a keeper notch 35 into which the hinged part of the sectional unit 19 may be releasably seated as shown in Fig. 3. Reference being had now to Figs. 5 and 6 it will be observed that a spring reeling device or drum is mounted in the bracket and includes a casing 36. Coiled around in this casing is a flat spring 37 extending out thru a slot in the casing and having its free end suitably attached to the hinged portion of the sectional unit 19 as shown at the front 38 in Fig. 2. This winding and reeling spring 37 therefor may be paid out through the slot 35 to allow the unit 19 to be pulled down and releasedly hooked over the steering wheel. In so doing the unit 19 functions as a desk and is constantly under tension. By releasing the hooks 29 from the rim of the steering wheel and the folding parts of the unit together said unit is automatically retracted under the tension of the spring and is pulled up into the keeper slot 35 where it is held in a swingable horizontal position. It is understood that when the device is in its retracted position it is susceptible of being swung in up or down, this being allowed by the yielding tendency of the winding spring. Thus it can be used either as a sun shield or visor when swung down, or swung upwardly to an out-of-the-way position where it is ready for use either as a visor or a desk as occasion demands.

Figure 11:
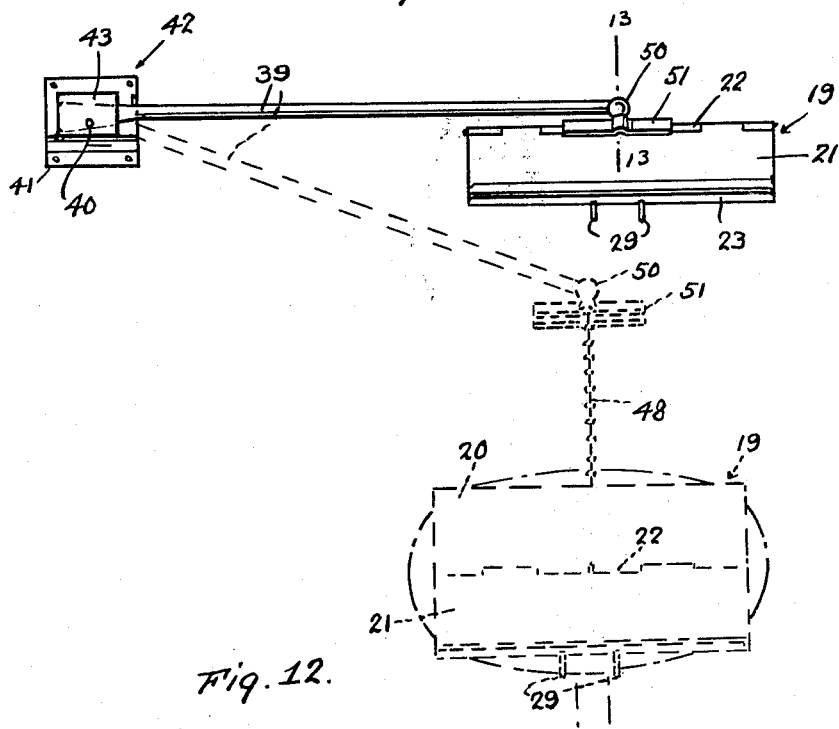
Figure 11 is an elevation view of a modification or a different style or form of the invention showing a mounting including a pivoted visor supporting arm.
Figure 12:
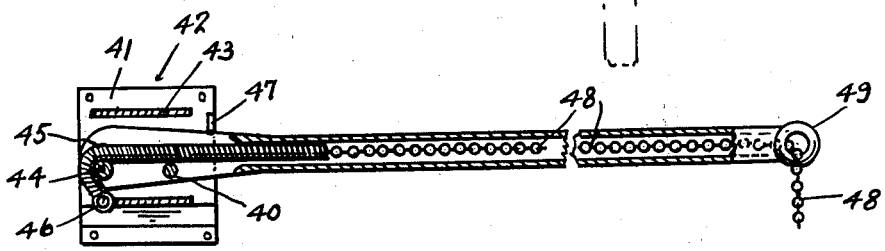
Figure 12 is a view partly in section and partly in elevation of the pivoted arm mounting fixture.
Figure 13:
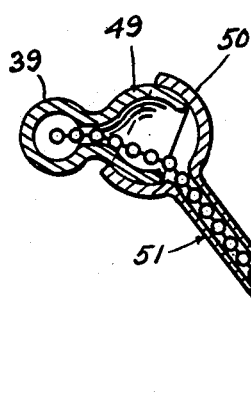
Figure 13 is an enlarged detail section showing to advantage the ball and socket joint, the view being on the line 13—13 of Fig. 11.

Admittedly, under certain conditions both forms of the invention so far described may not necessarily be satisfactorily applicable or usable in certain cars. It is believed advisable, therefore, to utilize a different kind of a hanger or mounting as shown in Figs. 11, 12 and 13. By way of introduction to these figures it is to be stated that so far as the unit 19 is concerned it is the same in construction as already described and therefore the same numerals are applied to corresponding parts. The distinction in these figures is in the pivoted arm or reach denoted by the numeral 39. This has its inner end suitably constructed and pivotally mounted as at 40 on the plate part 41 of the attaching fixture or mounting 42. A small hood or casing 43 is built on the plate to house the pivoted end and a friction roller 44 is carried by said pivoted end. It will be noted here that the numeral 45 designates an elongated coil spring permanently anchored at one end as at 46. The coil spring extends into the inner end of the tube. The tube is limited in its upward swing under the action of the spring by way of a stop or abutment 47 of any appropriate type. A chain 48 is connected at one end with the spring and extends at its opposite end out through a lateral hollow ball socket or ball joint member 49. This member 49 serves to accommodate the spherical or part-spherical cup 50 carried by the central portion of the retainer 51. Consequently, the chain is paid out through the tube under the retention action of the spring and passes through the ball and socket joint made up of features 49 and 50. It is attached to the hinged portion of the unit 19 thus functioning in approximately the same way as already described. In this arrangement the gist of the invention is in the provision of a suitable attaching fixture 42 having a pivoted reach arm or tube 39 with a retainer 50 universally connected therewith, the retainer serving as a holder for the extensible and retractable desk unit 19. Added to this is the idea of a spring and chain which function somewhat the same as the aforementioned reeling type flat spring shown in Fig. 5. In Figs. 1 to 10 inclusive and also in Figs. 11 to 13 inclusive there are obvious common or generic features. Then too, in all three forms of the invention we are confronted with the adoption and use of a relatively fixed mounting attachable to a relatively stationary support 17 the mounting having associated therewith keeper or retainer means to accommodate the hinged end portion of the plate sections 20 and 21 when they are overlapped. In the aforesaid simple form of the invention there is no tie connection between the unit 19 and the mounting. In the other forms of the invention there is a so called automatic spring cable means which provides a constant tie connection between said unit and the mounting fixture. These statements I make in order to enable the reader to determine the scope of the succeeding claims.

It is thought that the description taken in connection with the drawings will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

What is claimed is:

1. In a structure of the class described, a minature steering wheel writing desk comprising a pair of hingedly connected plates having means for detachable connection with the rim of a steering wheel, said plates being foldable into overlapping relationship, a holder including an attaching bracket designed to be secured to a part of the automobile above the windshield, said holder including a spring grip means to hold the folded desk in an out-of-the-way position.

2. In a structural assemblage of the class described, in combination, a relatively fixed support, a bracket secured to said support, a holder hingedly connected with said bracket, said holder including spaced parallel spring clips, and a convertible unit of the class described comprising a pair of hingedly connected overlapping plates removably held between said clips.

3. In a structural assemblage of the class described, in combination, a stationary support, a mounting rigidly secured to said support, a convertible unit comprising hingedly connected companion plate sections, means for attaching said unit to the steering wheel, means for releasably connecting the unit with said mounting, an extensible and retractible spring means attached at one end to said unit and attached at the opposite end to said mounting to provide an elastic tie connection between said unit and mounting as described.

4. In a structure of the class described, an attaching bracket of general U-shaped form, a casing mounted in said bracket, a flat spring wound in said casing, the bight portion of said bracket being provided with a keeper notch, a plate unit releasably engageable in said keeper notch, the free end of said spring being attached to said plate unit as described.

5. In a structure of the class described, a mounting, an arm pivotally secured to said mounting, said arm being of tubular form, a holder, a universal connection between the holder and one end of said reach arm, a visor releasably mounted in said holder, said visor including means for releasable connection with a steering wheel, a chain connected with the visor and passing through said tube, and spring means connected with said chain and anchored in said mounting as described.

6. A device of the class described comprising, in combination, a relatively fixed stationary support, an accommodation fixture secured rigidly to said support, said fixture including keeper means, and a multiple purpose unit detachably connected with said keeper means, said unit being made up of a pair of substantially duplicate hingedly connected companion plates foldable into overlapping relationship, or swingable into a plane substantially flush with each other, said unit being of such proportions when the plates are swung into the same plane as to permit attachment to a conventional automobile steering wheel in the manner and for the purposes described.

7. As a component part of a structural assemblage of the class described, a selectively usable multiple purpose convertible unit susceptible of use either as a sun visor or a miniature steering wheel writing desk, said unit comprising a pair of substantially duplicate flat plates, said plates being hingedly connected together along corresponding longitudinal edges to allow them to be swung in a plane with each other or folded into overlapping relationship, one of said plates being provided with a lateral flange constituting a work rest ledge, means for connecting the plates detachably with the steering wheel, and means for holding the folded plates in an out of the way position detached from the steering wheel when not in use.

FRANK C. BOWERMAN.